United States Patent [19]
Cuomo et al.

[11] Patent Number: 6,083,279
[45] Date of Patent: *Jul. 4, 2000

[54] PLATFORM INDEPENDENT TECHNIQUE FOR TRANSFERRING SOFTWARE PROGRAMS OVER A NETWORK

[75] Inventors: Gennaro A. Cuomo, Apex, N.C.; Simon Phipps, Highfield, United Kingdom; Richard J. Redpath, Cary, N.C.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/728,222

[22] Filed: Oct. 10, 1996

[51] Int. Cl.[7] .............................. G06F 9/44; G06F 17/30
[52] U.S. Cl. ...................... 717/3; 717/5; 717/1; 707/104; 707/101; 709/218; 709/231; 709/247; 380/4; 380/28; 380/49
[58] Field of Search ...................................... 395/705, 706, 395/702, 703, 701; 380/49, 4, 28; 707/100, 101, 102, 103, 104; 709/218, 231, 247

[56] References Cited

U.S. PATENT DOCUMENTS

| 5,630,126 | 5/1997 | Redpath | 707/103 |
|---|---|---|---|
| 5,706,502 | 1/1998 | Foley et al. | 707/10 |
| 5,742,768 | 4/1998 | Gennaro et al. | 345/326 |
| 5,757,925 | 5/1998 | Faybishenko | 380/49 |
| 5,768,597 | 6/1998 | Simm | 395/712 |
| 5,878,425 | 3/1999 | Redpath | 707/102 |
| 5,884,097 | 3/1999 | Li et al. | 710/43 |
| 5,911,071 | 6/1999 | Jordan | 395/701 |

*Primary Examiner*—Paul R. Lintz
*Assistant Examiner*—Tuan Q. Dam
*Attorney, Agent, or Firm*—Gregory M. Doudnikoff

[57] ABSTRACT

A technique for converting a software program into an object oriented class for sending across a network. A software program is loaded as instance data into a single object oriented class which is self-extracting. Preferably, each program file from the software program is compressed prior to being loaded as instance data into the class. The class may be a Java class which is sent over the Internet to a Java enabled computer system, where the class is unpackaged and the original software program recreated.

15 Claims, 6 Drawing Sheets

PLATFORM INDEPENDENT TECHNIQUE FOR TRANSFERRING SOFTWARE PROGRAMS OVER A NETWORK

BACKGROUND OF THE INVENTION

1. Field of the Invention

The present invention relates to a technique for converting object oriented software programs into a form which permits easy transport over a network. More particularly, the present invention relates to a technique for converting an object oriented software application into a single platform-independent class for sending over the Internet which is platform independent and installs itself at the receiving location.

2. Description of the Related Art

While the logic portion of a software program is typically written in a single programming language, data portions can be a hybrid of a number of different formats which are supported by the programming language in which the software application is written. For example, the data portions of a software application can include HTML files, GIF files, and JPEG files.

Software applications and/or data files are routinely sent over networks. A number of techniques and products exist for enhancing the sending and receiving of programs and data. One widely used tool is the PKZip product, which a sender of a program or data uses to package the program or data and which the receiver of the program or data from the network uses to unzip the program or data; that is, return the program or data to its normal form. Programs or data are often compressed using any of a number of known algorithms to reduce their size before being sent over network in order to minimize processor overhead and network traffic and speed delivery. Also, computer files can be packaged together as a self-extracting file which is sent over a network. When the receiving party opens the self-extracting file, the file automatically unpacks itself into its original constituent files.

The Java programming language includes features which make it highly popular for use with the network known as the Internet. Java is a trademark of Sun Microsystems, Inc. For example, small components of Java code known as applets can be retrieved or downloaded by computer users over the Internet. These applets are executed by an appropriate enabled receiving computer system as they are received by the receiving computer. However, this technique is not applicable to Java programs which include data outside of Java language constructs.

To date, no optimized network transfer solution has been developed for full scale programs written in object oriented languages, such as Java and Smalltalk. The network transfer solutions which do exist tend to mute the inherent platform independent efficiencies in full scale programs written in languages such as Java. Java applications can run on any platform which is Java enabled. However, if a sender used a PKZip tool on the Windows operation system to package a Java application for sending over a network, the receiving party must use a PKZip tool on the Windows operating system in order to unpackage the Java application. Windows is a trademark of Microsoft Corporation. Thus, platform dependence is reintroduced. Similarly, other packaging or compression techniques are often platform dependent. Thus, in order to optimize the platform independent ability of the Java programming language, a new technique is needed which permits enhanced packaging for the sending and receiving of software applications to and from any Java enabled platform.

Security has also become a major issue in the sending and receiving of programs and data over networks. The Java programming language has built in security features which permit Java classes being received by a receiving computer to be checked to make sure that they conform with certain standards before they are permitted to be received. In this era of computer viruses, network glitches and the transfer of bogus information, security is necessary to insure the integrity of the receiving computer. However, even for Java program, this does not extend to portions of the Java programs which are not Java classes, such as HTML files, GIF files, and JPEG files. Enhanced security for resource files results from the invention described in U.S. patent application Ser. No. 08/692,856, entitled "Technique for Creating Internet Enabled Resource Files" which was filed on Jul. 26, 1996 and is assigned to the same assignee as the present application. This technique converts individual data resource files into Java classes. While security is enhanced, it is not the prime focus of that invention, and does not address other problems associated with sending a Java application over a network.

Accordingly, a need exists for a platform independent technique for packaging, transferring and receiving object oriented programs over a network.

SUMMARY OF THE INVENTION

An object of the present invention is to provide a platform independent technique for sending object oriented programs over a network.

Another object of the present invention is to convert an entire Java program into a single Java class for transfer over a network.

Yet another object of the invention is to provide a technique for eliminating the need for platform dependent tools for sending and receiving object oriented software programs and data files over a network.

Other objects and advantages of the present invention will be set forth in part in the description and the drawings which follow, and, in part, will be obvious from the description or may be learned by practice of the invention.

To achieve the foregoing objects, and in accordance with the purpose of the invention as broadly described herein, the present invention provides a software implemented process for converting a software program into a single class, the software implemented process comprising first subprocesses for creating an object oriented class into which program files from the software program will be loaded; second subprocesses for loading each of the program files as instance data into the object oriented class; and third subprocesses for writing code into the object oriented class which permits the object oriented class to unpack itself and recreate the software program.

The present invention also provides computer readable code on media for loading data files into a single Java class for sending over the Internet, comprising first subprocesses for loading each of the data files as instance data into the Java class; second subprocesses for formatting the Java class with necessary Java formatting code; and third subprocesses for providing methods to the Java class to unpack and recreate the data files in their original form during receipt by a Java class loader of a receiving computer system.

The present invention will now be described with reference to the following drawings, in which like reference numbers denote the same element throughout.

DESCRIPTION OF THE PREFERRED EMBODIMENT

Figure 1:
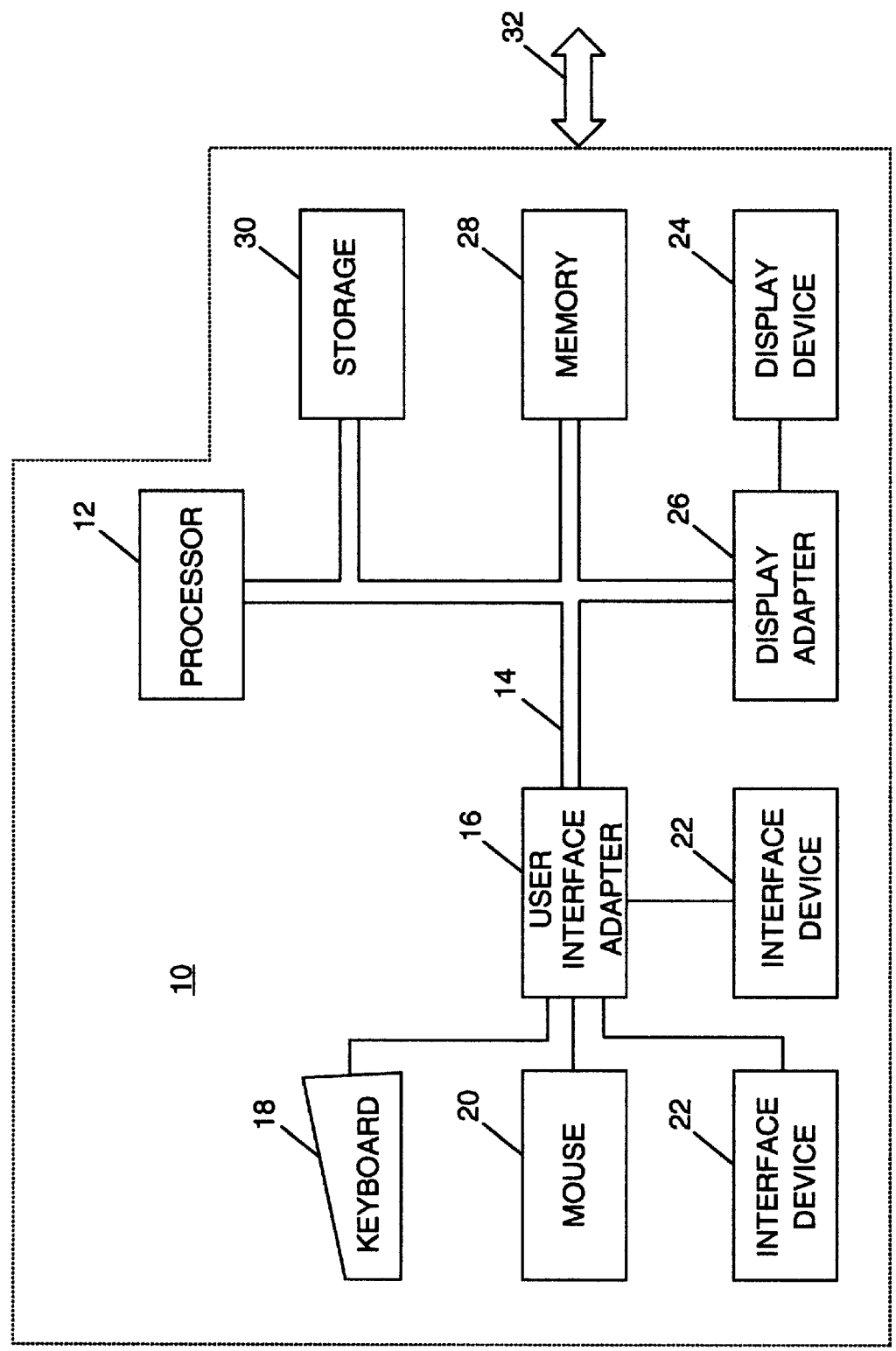
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and permanent storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 2:
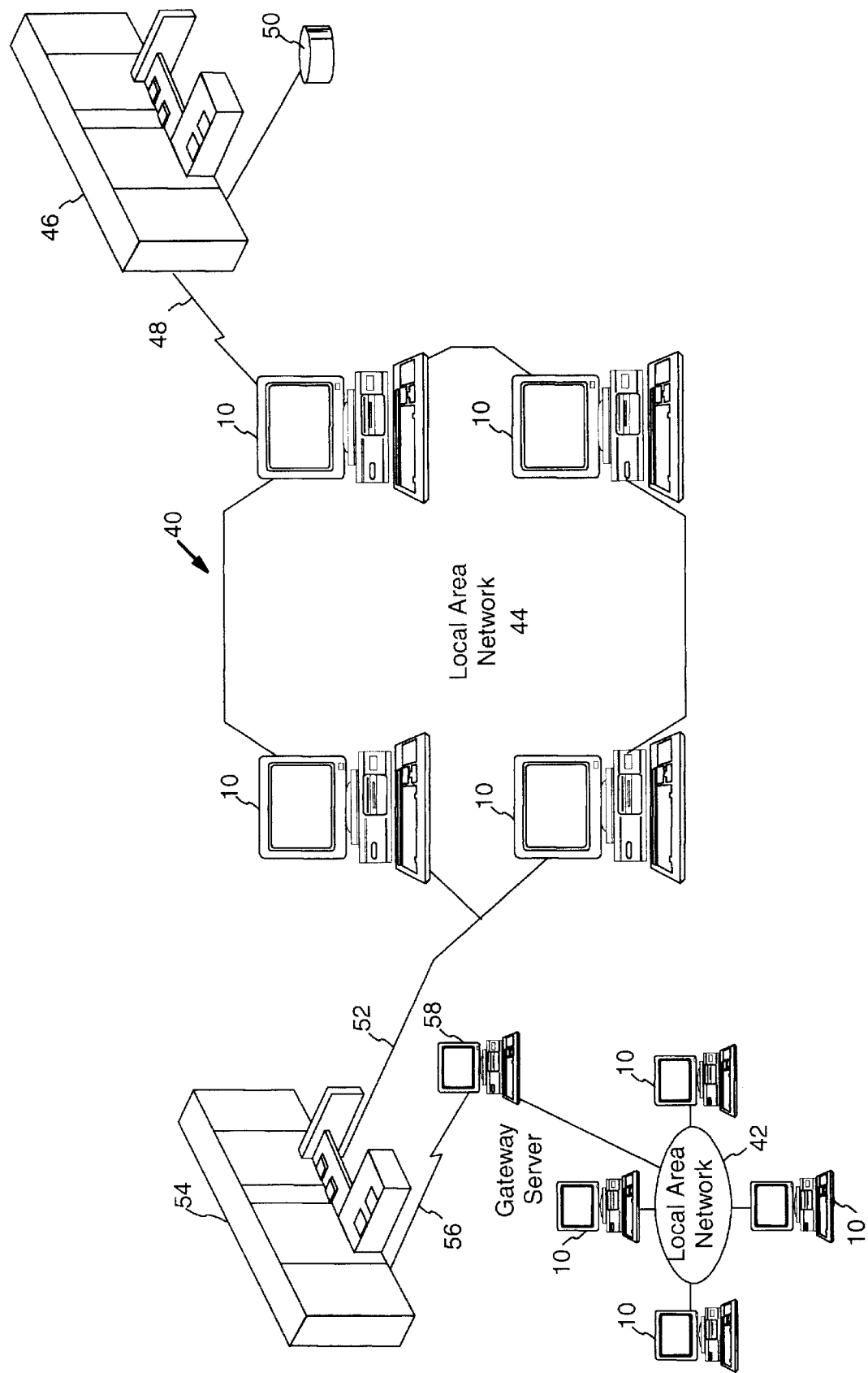
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 5.

In the preferred embodiment, the present invention is implemented as a tool written in the Java language for use with Java programs. Object oriented languages, such as Java, Smalltalk and C++, typically include class libraries for use by developers when programming (developing applications) in the language. Class libraries are reusable sets of classes which typically provide relatively high level functionality. A class is one of the basic building blocks of object oriented languages, and comprises code which represents a combination of function and data. A developer creates an application by adding classes from a class library to the software application being created. A copy or instance of a class is included in the application being created.

A developer may manipulate classes in a predetermined number of ways, depending on the features of the individual language. For example, most object oriented classes have a number of basic characteristics, including encapsulation, polymorphism, and inheritance. Through polymorphism, a software component or class may make a request of another instance of the class without knowing exactly what that component or object is. The object or component which receives the request interprets the request and determines, in accordance with its internal data and functions, how to execute the request. The concept of inheritance permits easy modification of a class. A developer can write a subclass which inherits behavior from all of its parent classes.

All of these properties of object oriented programming, as well as related object orienting programming techniques, are well known to those skilled in the art, and will not be discussed in depth herein. While the present invention will be described in terms of a technique for converting a Java program into a single, compressed self-extracting Java class, the present invention may be utilized by a skilled programmer for converting programs written in other object oriented languages into a single, compressed, self-extracting class.

Figure 3:
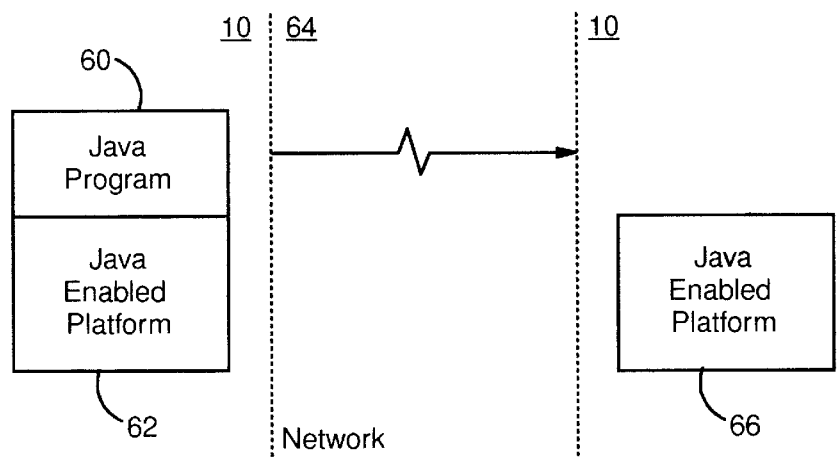
FIG. 3 graphically illustrates a logical software environment according to the present invention.

A logical environment in which the present invention may be practiced is illustrated in FIG. 3. FIG. 3 illustrates a Java program 60 which is present in memory and/or storage in a logical environment including a Java enabled software platform 62 within a first workstation 10. The Java program 60 may have been developed or modified within a Java development environment present within the memory of the first workstation 10, or may have been received from another computer system via a network or read from media such as a CD-Rom or diskette. The Java enabled platform 62 includes a software tool which provides function in accordance with the present invention, which permits the program 60 to be packaged into a single class for transmission over a network 64, such as the Internet. A second workstation 10 receives the packaged class from the network 64, and as the Java class is received by the Java enabled platform 66, the Java program 60 automatically unpacks itself, decompresses itself and recreates itself into its original form within the environment of the second workstation 10. As long as the second workstation 10 includes a Java enabled platform, the recreated Java program 60 is executable without modification.

One example of a Java enabled platform is OS/2 Warp version 4 from IBM. OS/2 is a registered trademark of IBM. A Java enabled platform essentially includes the execution environment for a Java program which includes what is known as a virtual machine. The execution environment for Java need not be necessarily already be included within an operating system, but is presently typically added by a user to the computing environment resident on the user's workstation. Other object oriented languages, such as Smalltalk, do not utilize pre-enabled platforms, but rather package that portion of virtual machine which is required for execution of a particular program during the development process for the program. In some cases, a Smalltalk program itself may be at least partially platform independent, that is, the program will execute in any one of a number of operating system environments for which the virtual machine has been enabled. Thus while the technique of the present invention is described relative to the Java programming language, it is applicable to a number of other programming languages as well.

Figure 4:
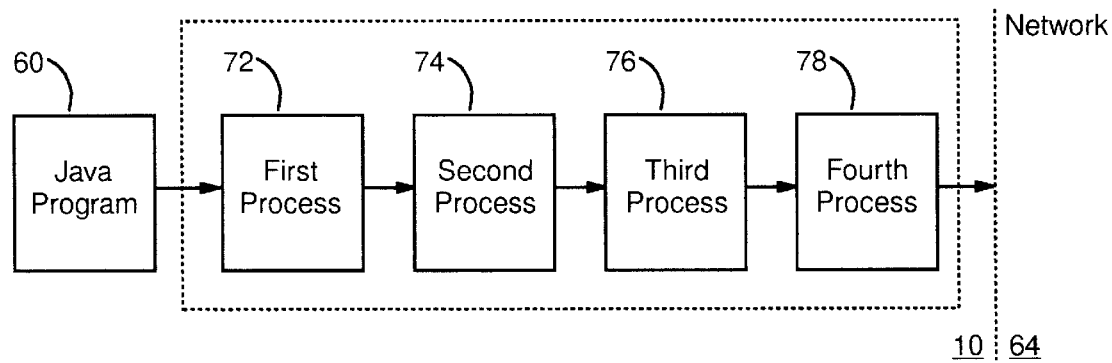
FIG. 4 illustrates logical flow of software program code in accordance with the present invention.
Figure 5A:
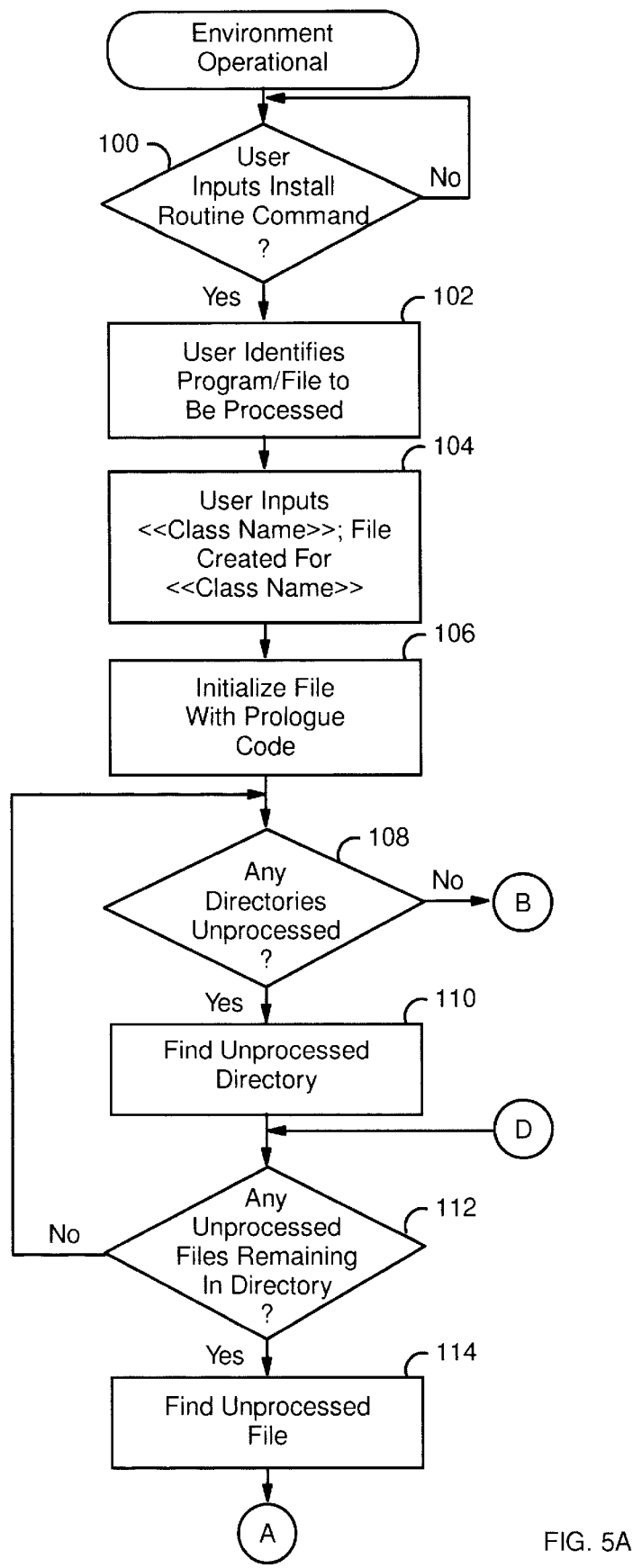
FIGS. 5A–5C illustrate a flow chart which sets forth the logic involved with preparing a program for sending over a network in accordance with the present invention.
Figure 5B:
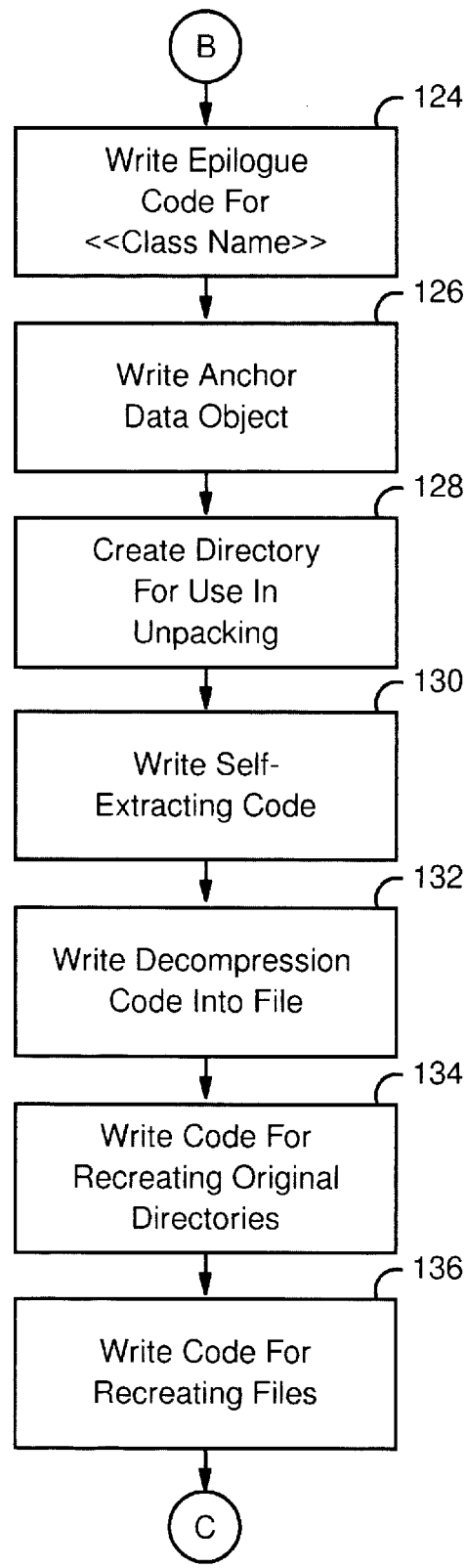
Figure 5C:
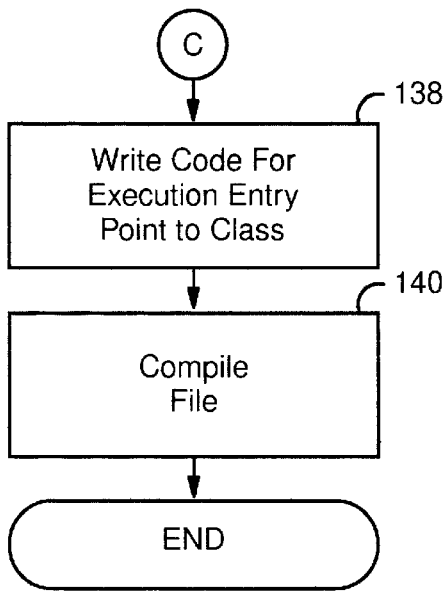
Figure 5C:
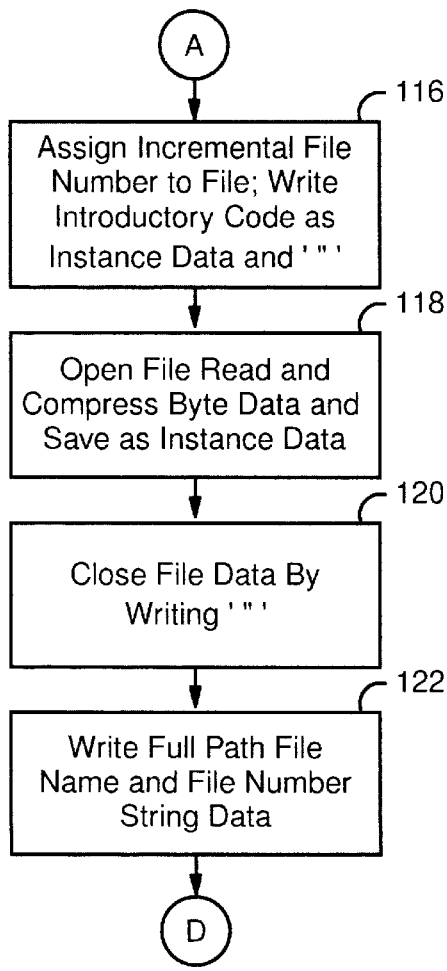

FIG. 4 illustrates the logical flow of data through a tool 70 which includes the function of the present invention. The tool 70 resides on a first workstation 10. The tool 70 is executed relative to the Java program 60 and first creates the shell of the single class into which the Java program 60 will be loaded in a first process 72. A second process 74 then recursively searches through each directory in the Java program 60 and processes each file in each directory of the program 60. The processing essentially loads each file as instance data in the single Java class being created. Preferably, as the code is read out of each file, and prior to the data being saved as instance data, the code is compressed utilizing any of a number of known compression techniques.

Next, a third process 76 writes necessary support code into the Java class necessary for formatting the class properly in accordance with Java language requirements and enabling the class to be able to decompress and self extract itself upon receipt by a Java enabled platform after being sent over a network. This includes writing the appropriate prolog and epilogue code for the class, creating a directory for use in unpacking the class, writing the self extracting code for the class, adding the decompression code to the class to enable automatic decompression of the instance data, writing code for recreating the original directories and original files, and writing code for providing an execution entry point to the class which, upon accessing by the Java class loader at receiving computer system, initiates the self-extraction protocol written into the Java class. A fourth process 78 compiles Java source code in the thus prepared Java class. The compiled Java class is ready to be sent over a network at any time.

The specific logical steps of the present invention will now be described with reference to the flowchart of FIG. 5.

Preferably, the present invention is provided in the form of a tool. The tool permits a developer or other user of an object oriented program or data files, such as HTML files, GIF files or JPEG files, to package the program (or data files) in accordance with the present invention, thus permitting enhanced use of a network and better utilization of the features of the Java language. While processing will be discussed relative to a Java program which includes both Java classes and data files to be utilized by the Java classes, the tool may be employed just to send data files from, for example, one Java user to another. Upon a developer invoking the tool (Step 100), the tool seeks input from the developer for identification of the program to be processed by the tool (Step 102). The tool also seeks input from the developer for a name for the single class that will be created containing the entire program for shipping across the network. The tool then creates an empty class file into which the code from the identified program will be processed (Step 104).

The necessary data and logic in the form of instance data and methods are then placed into the class file. The data includes the Java program itself, which is saved as instance data within the class file. The methods include logic for decompressing compressed instance data, unpackaging the class file and recreating the program files. The process for creating the complete Java class will now be described.

As per Step 106, Java class prolog format code is first written into the class file. The format code takes essentially the following form:

```
import java.lang.*;
import java.util.*;
import java.io.*;
public class classname {
```

Next, processing of the program files in the Java program is carried out. A Java program typically comprises of a number of directories which lists the individual files which comprise the Java program. These files include Java classes, HTML files, GIF files, and JPEG files. Until it is determined that all of the directories have been processed in Step 108, one of the unprocessed directories is selected for processing (Step 110). For the selected directory, until it is determined that no unprocessed files remain in the directory (Step 112), an unprocessed file is selected from the files listed in the directory for processing (Step 114). The selected file is then assigned an incremental file number. The first file processed is given the number zero, and each subsequent file processed is given the next available sequential whole number.

The following introductory Java code is written into the class file for the file being processed (Step 116):

```
public static String data{count}_{Segment}="
```

In this line of code, "count" is the number assigned to the program file being processed and "segment" is the data segment number for the code from the program file being processed which immediately follows. As discussed in detail below, the code from the program file is placed in the class as instance data in the form of a data string. In Java, such data strings are limited to 25K bytes of data. Thus, if the data string reaches 25K, no more code is written into the segment, the segment is ended, and a segment number counter is incremented for use in rewriting the introductory Java code for another segment of the program file. The introductory Java code is then written into the class file utilizing the same count or file number and the incremented segment number, and, starting with the next sequential code from the program file relative to the last code in the prior segment, code from the program file is written into the new segment. The initial segment number is zero, but the segment number is incremented after each segment is filled if the quantity of code requires more than one segment. The '"' at the end of the introductory Java code designates the beginning of the actual code from the program file being processed.

After the introductory Java code is written, the program file itself is opened, and the code from the program file is read and saved as instance data in the class file logically following the previously input '"'. Preferably, as the code from the program file is read out, the code is compressed in accordance with a known compression algorithm, and it is the compressed code that is saved as instance data in a string within the class file (Step 118). Compressing the file code has a number of advantages. The resulting class file is smaller than it otherwise would have been with uncompressed code. This reduces the length of time it takes to send the class file over a network, which reduces network traffic, frees up network servers to perform other tasks and generally reduces the costs associated with transferring data over a network. However, compression is not necessary in order to take advantages of the other aspects of the present invention. The compression technique utilized may be any of a number of available and known compression techniques, and a specific implementation will not be discussed in detail.

After all of the program file code has been saved as instance data within the class file or when a segment becomes full, a '";' is written within the class file at the end of the code to indicate the end of the string (Step 120). In Step 122, Java code is then written into the class file containing the full path filename and string data generated relative to the program file code just written into the class file as follows:

```
public static String [] data {count}={"filename", data {count}_
    segment {segment0}, . . . , data {count}_segment {segment
    n}};
``` where "count" is the assigned file number and "n" is the highest segment number for the just-processed program file. This code identifies the just-loaded instance data for the program file and the segments associated therewith, and is utilized by an anchor object during the unpackaging process. The line of code defines the segments which are associated with each program file number. The last part of this line of code, "data {count}_segment {segment#} is repeated until all the segment numbers required to write the program file into the class file have been listed, beginning with segment number 0.

Processing then returns to Step 112 to determine if any additional unprocessed program files remain in the directory being processed. If so, Steps 114–122 are carried out relative to each unprocessed file. When it is finally determined in Step 112 that no further unprocessed files remain in the directory, processing returns to Step 108, in which it is determined whether all of the directories in the program have been processed. If not, processing continues for the unprocessed directories and the program files they contain as has been described relative to Steps 110–122. When it is finally determined in Step 108 that no further unprocessed directories remain, processing for the class file then proceeds to Step 124.

The class file that is created is a single Java class which may be quite large, depending on the size of the program. Still, the class must conform to the defined Java class format. Additionally, the class needs to include a number of methods which permit the class to unpackage and decompress itself automatically as it is received by the Java class loader of the receiving computer system.

Following the loading of the last of the program file into the class file, epilogue code is written into the class file as follows:

```
public static int major=1;
public static int minor=0;
public static int count={count};
``` where "count" is the highest count number assigned to a program file (the total number of program files that have been processed less one) (Step 124). The epilogue code includes file version information and count information to be used in unzipping the class file.

Next, an anchor data object is written into the class file which is initialized with count files processed data items. Preferably, the code for the anchor data object reads as follows:

```
public static Object[] data= {data0,
                             data1
                             :     |
                             :     |
                             datan} ;
``` where "n" is the highest assigned file number. The anchor data object is utilized as an index to the program file data stored in the class file, and relies on the previously defined data numbers to identify the data associated with each program file.

The necessary support code for enabling the class to unpack and self extract and decompress itself is then written into the class file. Preferably, the code includes code which indicates to the Java class loader that the Java class file is not an applet so that the Java class loader will not process the class as an applet. Additionally, a directory is written into the class file for use by the class file in recreating the original program as the class file is being unpacked (Step 128). This class directory takes the form of:

```
public static String[] filename={fullpathname0,
                                 {fullpathname1,
                                 :     :
                                 :     :
                                 {fullpathnamen};
``` where "n" is the highest assigned file number. Thus, each program file 1 through n is also identified in a directory in the class file by its fullpath name.

Preferably, a method for enabling the class file to be self extracting is then written into the class file (Step 130). Creating self extracting files is a known process. The method may take the following form:

```
public static void mkdirs (String directory) {
    File file = new File(directory;
    int index;
    if (file.exists () ==false) {
        if ( (index = directory.lastIndexOf('/'))!=(-1))
            mkdirs (directory.substring (0, index));
        file.mkdirs ();
    }
}
```

A method for decompressing the previously compressed file data is also placed in the file class, such that as the compressed instance data for each program file is read out of the class file after it is received by the receiving computer system, the compressed code is decompressed and returned to its original state (Step 132). Compressing and decompression techniques are well known and will not be further discussed in detail herein. Support code is also written into the class file for recreating the original directories and recreating the original files (Steps 134, 136). Java code for methods which include logic to make the class self extracting, create the original directories and output the original files may be written as follows:

```
public static void doit () {
    String filedata [];
    String string;
    String previous=\"\";
    int index;
    File createdir;
    PrintStream output;
    for (int i=0; i<count; i++) {
        System.out.println(filename[i]);
        if ((index=filename[i] .lastIndexOf ('/'))!=(-1)) {
            string = filename[i] .substring(0,index);
            if (string.compareTo(previous) !=0) {
                previous = string;
                mkdirs(string);
            }
        }
        try {
            output = new PrintStream (new FileOutputStream (filename[i]) )
        } catch (IOException e) {
            System.err.println(\"Error: IO
            exception \" + filename[i] + return;
        }
        filedata = (String[])data[i];
        for (int j=0; j<filedata.length; j++) {
            string = filedata[j] ;
            output.print (string) ;
            output.flush ();
        }
        output.close();
    }
}
```

Code for providing an executable entry point into the class is then written into the class (Step 138). This code provides an entry point which is located and initiated by the Java class loader of the receiving computer system. When the Java class loader initiates the entry point, the methods written into the class file are executed, which unpack the class file, decompress the compressed program files and recreate the original program. Java code written into the class for providing an execution entry point may be as follows:

```
public static void main(String args[]) {
    classname.doit ();
}
```

The Java source code written into the class file is then compiled in accordance with known techniques (Step 140). This completes processing of the class file. The self-extracting class file is ready to be shipped over a network such as the Internet.

While the present invention has been described relative to the Java programming language, the basic techniques described herein may be applicable to many types of object oriented languages. Thus, while the preferred embodiment of the present invention has been described, additional variations and modifications in that embodiment may occur to those skilled in the art once they learn of the basic inventive concepts. Therefore, it is intended that the appended claim shall be construed to include both the preferred embodiment and all such variations and such modifications as fall within the spirit and scope of the invention.

What is claimed is:

1. In a computing environment, a software implemented process for converting a software program into a single class, said software implemented process comprising:
    first subprocesses for creating an object oriented class into which program files from the software program will be loaded wherein the software program is a Java language program which includes non Java language data files;
    second subprocesses for loading each of the program files as instance data into the object oriented class; and
    third subprocesses for writing code into the object oriented class which permits the object oriented class to unpack itself and recreate the software program.

2. A software implemented process according to claim 1, further comprising:
    fourth subprocesses for compressing each of the program files prior to loading the program files as instance data into the object oriented class,
    wherein said third subprocesses further comprises writing code for decompressing the compressed instance data while the object oriented class is unpacking itself and recreating the software program.

3. A software implemented process according to claim 1, further comprising:
    fourth subprocesses for compiling the object oriented class.

4. A software implemented process according to claim 1, wherein the object oriented class is a Java class.

5. In a computer environment, a system for permitting creation of a single class from a software program for sending over a network, said system comprising:
    means for loading each program file from the software program as instance data into the single class wherein the software program is a Java language program which includes non Java language data files;
    means for providing format code into the single class; and
    means for writing code into the single class for permitting the single class to automatically unpack itself and recreate the software program during receipt of the single class by a receiving computer system from a network.

6. A system according to claim 5, wherein the single class is a Java class, is platform independent and does not require the receiving computer system to have any tools resident therein to assist in unpacking the single class.

7. A system according to claim 6, wherein said means for writing code further comprises writing code for creating an executable entry point to the Java class, wherein a Java class loader of the receiving computer system locates the executable entry point while receiving the Java class from the network and accesses the entry point to cause the Java class to unpack itself and recreate the software program.

8. A system according to claim 5, further comprising:
means for compressing each of the program files prior to loading each of the program files into the single class.

9. The system according to claim 8, wherein said means for writing code further writes a decompression method into the single class for decompressing the instance data for each of the program files as the instance data is read out of the single class.

10. A method for preparing a Java software program for sending over a network, the software program having program files which include data files not written in the Java language said method comprising:
creating a class;
loading the program files as instance data into the class;
providing class format code for the class; and
providing support code in the class for permitting the class to unpack itself and recreate the software program after it is received by a receiving computer system from a network.

11. A method according to claim 10, further comprising:
compressing code which comprises each of the program files prior to loading the code as instance data into the class;
wherein said step of providing support code further comprises providing code for decompressing the instance data while the software program is being recreated.

12. A method according to claim 10, wherein the class is a Java class which is platform independent and does not require the receiving computer system to have any tools resident thereon for unpacking the class.

13. Computer readable code on media for loading data files into a single Java class for sending over the Internet, comprising:
first subprocesses for loading each of the data files as instance data into the Java class;
second subprocesses for formatting the Java class with necessary Java formatting code; and
third subprocesses for providing methods to the Java class to unpack and recreate the data files in their original form during receipt by a Java class loader of a receiving computer system.

14. Computer readable code on media according to claim 13, wherein the data files include at least one of HTML files, JPEG files and GIF files.

15. Computer readable code according to claim 13, further comprising:
fourth subprocesses for compressing the data files prior to loading the data files as instance data into the Java class,
wherein said third subprocesses further provides a method to the Java class to decompress the compressed instance data during unpacking of the Java class and recreating of the data files.

* * * * *